US012628149B2

(12) United States Patent
Gou et al.

(10) Patent No.: US 12,628,149 B2
(45) Date of Patent: May 12, 2026

(54) CODEBOOK RETRANSMISSION INDICATION IN CONTROL SIGNALING

(71) Applicant: ZTE Corporation, Guangdong (CN)

(72) Inventors: Wei Gou, Shenzhen (CN); Junfeng Zhang, Shenzhen (CN); Jing Shi, Shenzhen (CN); Shuaihua Kou, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/521,812

(22) Filed: Nov. 28, 2023

(65) Prior Publication Data

US 2024/0107513 A1 Mar. 28, 2024

Related U.S. Application Data

(63) Continuation of application No. PCT/CN2021/128962, filed on Nov. 5, 2021.

(51) Int. Cl.
*H04W 72/11* (2023.01)
*H04L 1/1812* (2023.01)
*H04W 72/21* (2023.01)
*H04W 72/566* (2023.01)

(52) U.S. Cl.
CPC .......... *H04W 72/11* (2023.01); *H04L 1/1812* (2013.01); *H04W 72/21* (2023.01); *H04W 72/566* (2023.01)

(58) Field of Classification Search
CPC .... H04W 72/11; H04W 72/21; H04W 72/566
USPC ........................................................ 370/329
See application file for complete search history.

(56) References Cited

U.S. PATENT DOCUMENTS

| | | | | |
|---|---|---|---|---|
| 2018/0367263 | A1 | 12/2018 | Ying et al. | |
| 2021/0006376 | A1 | 1/2021 | Cirik et al. | |
| 2022/0322180 | A1* | 10/2022 | Ly | H04W 72/21 |
| 2023/0045191 | A1* | 2/2023 | Dimou | H04L 1/1854 |

(Continued)

FOREIGN PATENT DOCUMENTS

| | | |
|---|---|---|
| CN | 111193578 A | 5/2020 |
| WO | 2020/145704 A1 | 7/2020 |

(Continued)

OTHER PUBLICATIONS

JPO, Office Action for Japanese Application No. 2024-521799, mailed on Apr. 30, 2025, 7 pages with unofficial English translation.

(Continued)

*Primary Examiner* — Joseph Arevalo
(74) *Attorney, Agent, or Firm* — Perkins Coie LLP

(57) ABSTRACT

Methods, apparatus, and systems that facilitate the indication of the codebook to be transmitted/retransmitted are disclosed. In one example aspect, a method for wireless communication includes transmitting, by a base station, a physical-layer control signaling message to a user device triggering a retransmission of a codebook for a feedback transmission that has been previously canceled. The physical-layer control signaling message includes a field of resource assignment that is used to indicate an attribute associated with the codebook. The method also includes receiving, by the base station, the retransmission of the codebook from the user device according to the physical-layer control signaling message.

18 Claims, 7 Drawing Sheets

PUCCH 1 (canceled)

Triggering DCI

PUCCH 2 t1    t2

(56) References Cited

U.S. PATENT DOCUMENTS

| | | | |
|---|---|---|---|
| 2024/0014947 A1* | 1/2024 | Elshafie | H04L 1/188 |
| 2024/0080844 A1* | 3/2024 | Lu | H04W 72/21 |
| 2024/0179702 A1* | 5/2024 | Zeng | H04L 5/0055 |

FOREIGN PATENT DOCUMENTS

| | | | |
|---|---|---|---|
| WO | 2021180897 A1 | 9/2021 | |
| WO | 2023077417 A1 | 5/2023 | |

OTHER PUBLICATIONS

International Search Report for International Application No. PCT/CN2021/128962, Mail Date: Jul. 28, 2022. 9 pages.

Xiaomi, "HARQ-ACK feedback enhancement for URLLC/IIoT," 3GPP TSG RAN WG1 #103, e-Meeting, Oct. 26-Nov. 13, 2020, R1-2007900.

EPO, Extended European Search Report for European Application No. 21962931.8, mailed on Nov. 7, 2024, 10 pages.

OPPO, "HARQ-ACK enhancements for Rel-17 URLLC/IIoT," 3GPP TSG RAN WG1 #106bis-e, e-Meeting, R1-2109093, Oct. 11-19, 2021, 6 pages.

JPO, Notice of Allowance for Japanese Application No. 2024-521799, mailed on Dec. 22, 2025, 3 pages with unofficial English translation.

Moderator (Nokia), "Moderator summary #2 on HARQ-ACK feedback enhancements for NR Rel-17 URLLC/IIOT," 3GPP TSG-RAN WG1 Meeting #106bis-e, e-Meeting, R1-2110527, Oct. 11-19, 2021, 191 pages.

* cited by examiner transmitting, by a base station, a physical-layer control signaling message to a user device triggering a retransmission of a codebook for a feedback transmission that has been previously canceled

310 receiving the retransmission of the codebook from the user device according to the physical-layer control signaling message

320

300

350 receiving, by a user device, a physical-layer control signaling message from a base station triggering transmission that has been previously canceled
360 performing, by the user device, the retransmission of the codebook to the base station according to the physical-layer control signaling message
370

CODEBOOK RETRANSMISSION INDICATION IN CONTROL SIGNALING

CROSS REFERENCE TO RELATED APPLICATIONS

This patent document is a continuation of and claims benefit of priority to International Patent Application No. PCT/CN2021/128962, filed on Nov. 5, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that facilitate the indication of the codebook to be transmitted/retransmitted without introducing additional signaling overhead or increasing blind detection complexity for the user devices.

In one example aspect, a method for wireless communication includes transmitting, by a base station, a physical-layer control signaling message to a user device triggering a retransmission of a codebook for a feedback transmission that has been previously canceled. The physical-layer control signaling message includes a field of resource assignment that is used to indicate an attribute associated with the codebook. The method also includes receiving, by the base station, the retransmission of the codebook from the user device according to the physical-layer control signaling message.

In another example aspect, a method for wireless communication includes receiving, by a user device, a physical-layer control signaling message from a base station triggering a retransmission of a codebook for a feedback transmission that has been previously canceled. The physical-layer control signaling message includes a field of resource assignment that is used to indicate an attribute associated with the codebook. The method also includes performing, by the user device, the retransmission of the codebook to the base station according to the physical-layer control signaling message.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
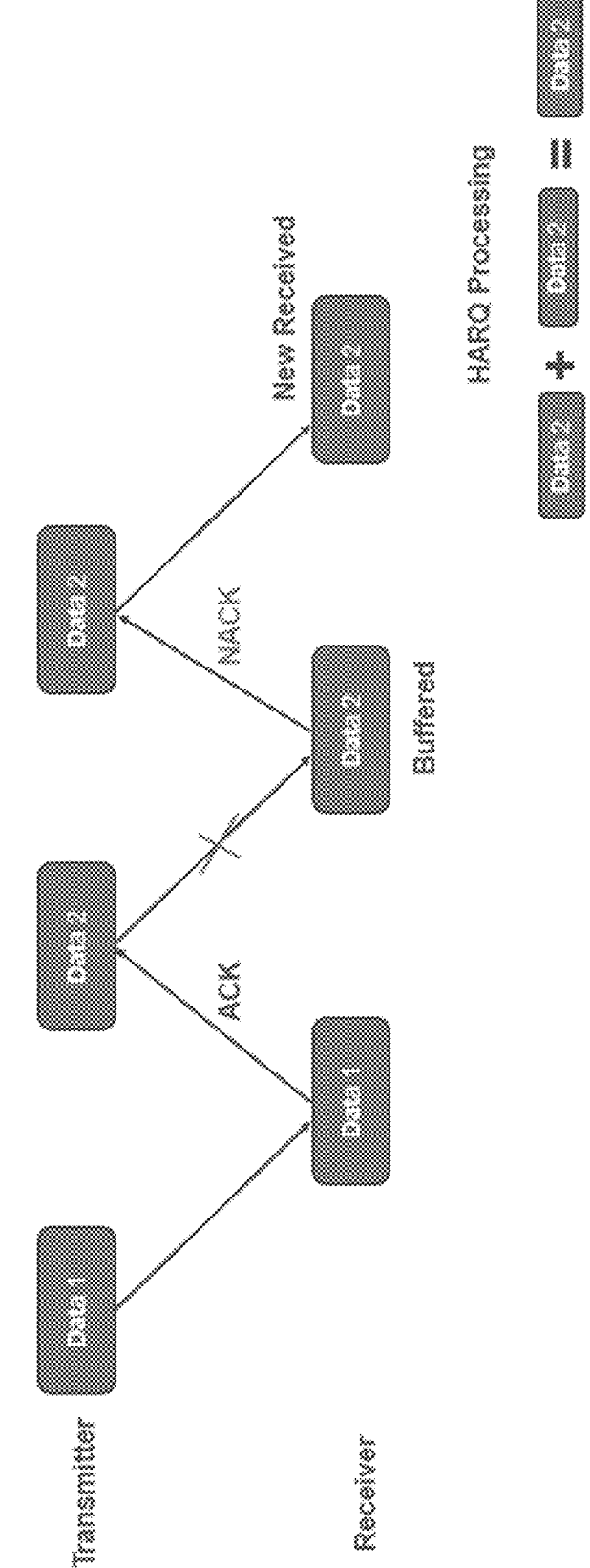
FIG. 1 illustrates an example HARQ procedure used in wireless communications.

Hybrid Automatic Repeat Request (HARQ) is a procedure to provide feedback information regarding wither data packets have been transmitted successfully. FIG. 1 illustrates an example HARQ procedure used in wireless communications. The HARQ Acknowledgment (ACK) information can be of different types. Type 1 HARQ ACK information includes forward error correction bits; Type 2 and Type 3 HARQ ACK information introduce redundancy for each re-transmission.

With the advance in wireless technology, HARQ ACK codebooks that carry feedback information can have different priorities. In the New Radio (NR) technology, when high-priority and low-priority HARQ ACK codebooks overlap in time domain (e.g., on the Physical Uplink Control Channel), the PUCCH transmission(s) corresponding to the low-priority HARQ-ACK codebook(s) can be dropped while the transmission of the high-priority HARQ-ACK is preserved. The dropping of the low-priority HARQ-ACK can affect downlink data transmission performance. In some cases, when the transmission(s) of the high-priority HARQ ACK codebook(s) overlap with downlink symbols in the time domain, the high-priority HARQ ACK codebook(s) can also be dropped or canceled.

Retransmissions of the cancelled or dropped HARQ-ACK codebooks can effectively address the data transmission performance problems caused by the missing feedback information. Currently, the Third-Generation Partnership Project (3GPP) standard body has agreed to use the physical-layer signaling message (e.g., Downlink Control Information, DCI, signaling) to schedule the transmission/re-transmission of the canceled HARQ-ACK codebook. One example method uses a physical layer signaling message, e.g., a DCI signaling message, to trigger a retransmission of the canceled HARQ-ACK codebook on PUCCH without reconstructing the codebook. However, when there are multiple canceled/drooped HARQ-ACK codebooks, the user device (also referred to as user equipment, UE) may not know which HARQ-ACK codebook needs to be retransmitted upon being triggered by the base station.

Another example method uses a physical layer signaling message, e.g., a DCI signaling message, to trigger a reconstruction of the HARQ-ACK codebook (e.g., a HARQ-ACK Type 3 codebook). The new HARQ-ACK codebook includes the HARQ-ACK information corresponding to the cancelled/dropped HARQ-ACK codebook. To reduce the signaling overhead, enhanced Type 3 HARQ has been proposed to use only part of the HARQ processes to construct the type3 codebook. However, the enhanced type3 codebook may not include all the canceled HARQ-ACK information as the canceled HARQ-ACK information may have been processed by HARQ process that are not used to reconstruct the codebook.

This patent document discloses techniques that can be implemented in various embodiments to enable the indication of the codebook to be transmitted/retransmitted without introducing additional signaling overhead or increasing blind detection complexity for the UE. The disclosed techniques are applicable in various scenarios (e.g., when the DCI schedules a downlink data transmission on the Physical Downlink Shared Channel, PDSCH, or when the DCI simply triggers the HARQ-ACK transmission/retransmission) as well as different HARQ types (e.g., Type 2, Type 3 and/or enhanced Type 3).

Some examples of the disclosed techniques are further described in the following example embodiments.

Embodiment 1

When there are multiple canceled/drooped HARQ-ACK codebooks, to enable the user device to determine which HARQ-ACK codebook needs to be retransmitted, the physical layer signaling message (e.g., DCI signaling) can include a field that indicates one or more attributes of the HARQ-ACK codebook, such as the size or the priority of the HARQ-ACK codebook. In some embodiments, the attribute can include an offset value that describes a slot position in which the HARQ-ACK codebook was canceled. In other words, based on the offset field, the HARQ-ACK codebook to be retransmitted is ascertained from the multiple HARQ-ACK codebooks that have been canceled. For example, when there are multiple cancelled HARQ-ACK codebooks in different slots, the offset field can be used to indicate which HARQ-ACK codebook is scheduled. If there are high- and low-priority HARQ-ACK codebooks in the same slot, the HARQ-ACK codebook that is scheduled to be retransmitted can be determined further based on the priority or the size of the HARQ-ACK codebook.

To eliminate additional signaling overhead and/or blind detection complexity for the UE, an existing DCI format and an existing field in the DCI can be reused or reinterpreted to represent the attribute(s) of the HARQ-ACK codebook. In particular, when the existing DCI format is also used to schedule transmissions (e.g., downlink transmissions on PDSCH), it is important to select a field that does not interfere the signaling of other transmission parameters.

In some embodiments, the DCI signaling that triggers the HARQ-ACK retransmission (also referred to as the triggering DCI) also schedules a downlink transmission on the PDSCH. The HARQ-ACK corresponding to the PDSCH does not need to form a HARQ-ACK codebook with other HARQ-ACK information—that is, there is no need to bundle the HARQ-ACK corresponding to the PDSCH in one codebook. Under these circumstances, the field Downlink Assignment Index (DAI) is no longer valid and can be reused/re-interpreted to indicate an attribute associated with the codebook (e.g., the size of the codebook).

The DAI field can include two subfields: counter DAI (C-DAI) and total DAI (T-DAI). C-DAI represents the cumulative number of scheduled PDSCHs up to the current scheduled PDSCH (inclusive). T-DAI represents the cumulative number of scheduled PDSCHs up to the current PDCCH monitoring occasion (MO) (inclusive). Table 1 shows an example DAI field in DCI Format 1_1. When the DAI field is invalid, the C-DAI and/or T-DAI sub-fields can be used to indicate the size and/or the offset value associated with the HARQ-ACK codebook. Here, the size can be the size of the canceled HARQ-ACK codebook or the sum of size of the canceled HARQ-ACK codebook and the size of the canceled HARQ-ACK codebook and the HARQ-ACK corresponding to the PDSCH scheduled by the triggering DCI.

TABLE 1

| Field | Bits | |
| --- | --- | --- |
| Downlink assignment index | 0, 2, 4 | 4 bits if more than one serving cell are configured in the downlink and pdsch-HARQACK-Codebook = dynamic, where the 2 Most-Significant-Bits are the C-DAI and the 2 Least-Significant-Bits are T-DAI; 2 bits if only one serving cell is configured, where the 2 bits are C-DAI; 0 bits otherwise |

Currently, when the user device is configured with a type 2 HARQ-ACK codebook, including the enhanced Type 2 HARQ-ACK codebook, the corresponding DCI signaling message includes the DAI field. If the UE is configured with a Type1 or Type3 HARQ-ACK codebook or an enhanced Type3 HARQ-ACK codebook, the corresponding DCI does not include the DAI field. Thus, for Type 1 or Type 3 (including enhanced Type 3) HARQ-ACK codebooks, alternative fields in the DCI can be reused/reinterpreted. In some embodiments, a new rule can be imposed to require that the DCI corresponding to all types of HARQ-ACK needs to have a format that includes the DAI field. In some embodiments, new bits can be added to existing DCI formats to enable the indication of the codebook attribute(s).

Some example indication modes are described below.

Mode 1

In some embodiments, the combination of C-DAI and T-DAI in the triggering DCI can be used to represent the size of the codebook. For example, four bits of C-DAI and T-DAI represent the size of the HARQ-ACK codebook scheduled by the triggering DCI. When only one serving cell is configured (see Table 1), the C-DAI field (e.g., 2 bits) can be used to represent the size.

Mode 2

In some embodiments, the combination of C-DAI and T-DAI in the triggering DCI can be used to represent the offset field. When only one serving cell is configured (see Table 1), the C-DAI field (e.g., 2 bits) can be used to represent the offset.

Mode 3

In some embodiments, the C-DAI field (e.g., 2 bits) represents the size field, and T-DAI field (e.g., 2 bits) represents the offset field. The offset field can be omitted when only one serving cell is configured (see Table 1).

Mode 4

In some embodiments, the C-DAI field (e.g., 2 bits) represents the offset field, and the T-DAI field (e.g., 2 bits) represents the size field. The size field can be omitted when only one serving cell is configured (see Table 1).

As noted above, in some cases, the DAI field only includes one sub-field (e.g., C-DAI with two bits) that can be used to represent one attribute (e.g., either the size or the offset). Because codebooks with different sizes/priorities can be scheduled in the same time location, it is preferred to indicate the size value of the codebook to enable the user device to ascertain the codebook to be retransmitted.

Additional modes can be added for attributes other than the size and offset values (e.g., the priority of the canceled HARQ-ACK codebook or the HARQ processes associated with the codebook). Different indication modes can be configured by higher-layer signaling (e.g., Radio Resource Control, RRC, signaling) from the base station, thereby allowing flexibility in physical layer indication of the codebook attributes. For example, a new information element can be introduced in the RRC signaling to indicate which indication mode is used in the triggering DCI to indicate the attributes.

In some embodiments, because only two bits are provided to indicate the attribute, the base station can configure a set of attribute values via higher-layer signaling (e.g., RRC signaling) so that a wider range of values can be indicated. Take the offset value as an example, the base station can configure a set of offset values using the RRC signaling (e.g., {1, 3, 6, 8}). The RRC signaling can be UE-specific RRC signaling, so that each UE can be configured with a different set of offset values. The offset values can represent the interval (e.g., the number of slots) between the time unit (e.g., slot or symbol) where the triggering DCI is located and the time unit (e.g., slot or symbol) where the canceled HARQ-ACK codebook is to be re-transmitted. Alternatively, or in addition, the offset values can represent the interval between the time unit (e.g., slot or symbol) where the HARQ-ACK codebook that has been canceled is located and the time unit (e.g., slot or symbol) where the canceled HARQ-ACK codebook is to be re-transmitted. The triggering DCI includes an index value that can be represented using two bits (e.g., a value in the range of [0, 3]). The index value indicates the corresponding offset value in the set.

In some embodiments, the set of offset values configured in the RRC signaling includes a special value (e.g., a non-numeric value). The special value indicates that previously only one HARQ-ACK codebook has been cancelled. When the triggering DCI includes the special value, the user device can determine the codebook as only one has been canceled.

In some embodiments, the RRC signaling can be configure the offset value in the triggering DCI is omitted (e.g., the corresponding field does not exist or has 0 bit) or reserved (e.g., the bits of offset value exist, but the UE ignores it). In those cases, the user device assumes that only one HARQ-ACK codebook has been canceled and determine the codebook accordingly.

Figure 2A:
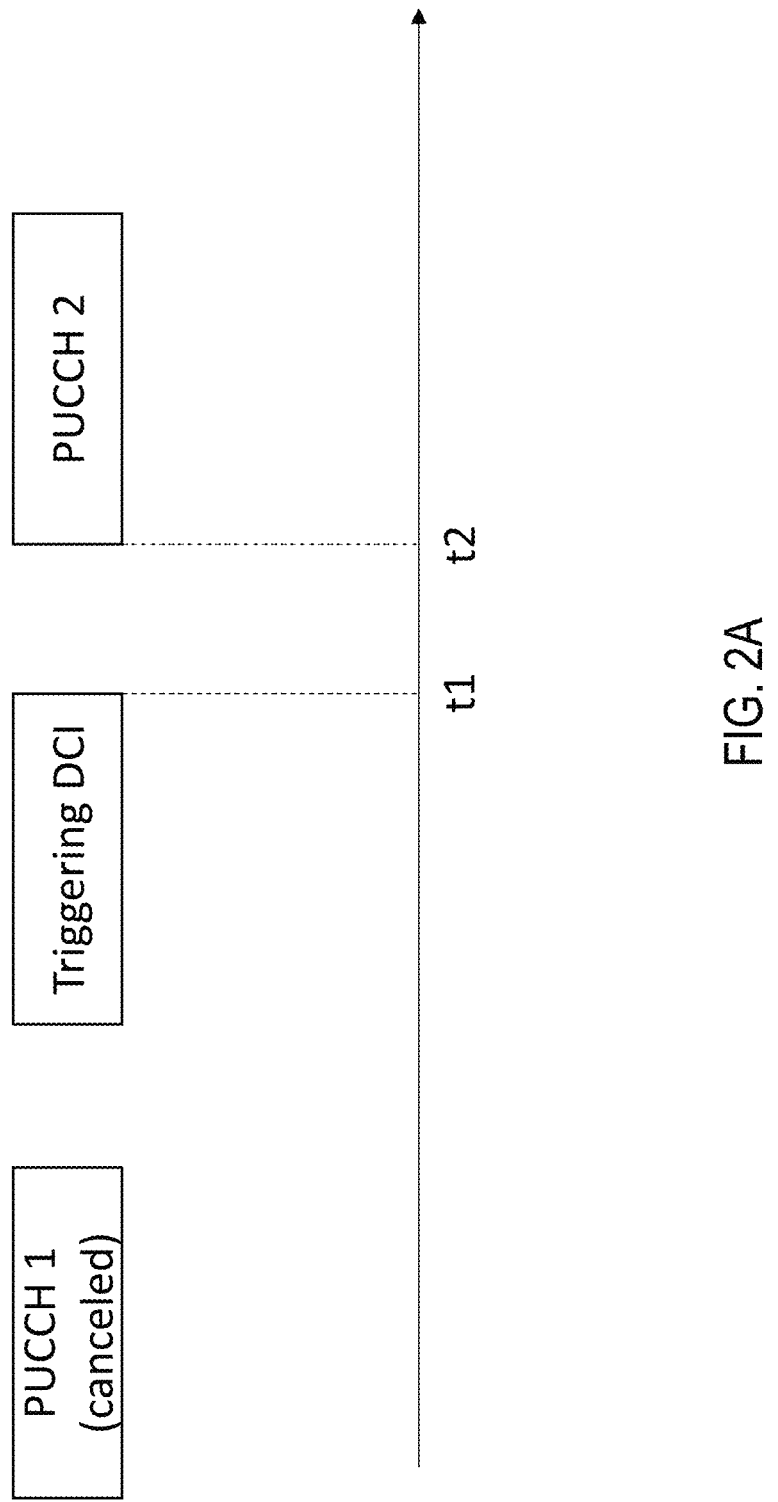
FIG. 2A illustrates an example timeline of operations performed by the user device in accordance with one or more embodiments of the present technology.

In some embodiments, the UE can require some processing time between the cancellation of the transmission of the HARQ-ACK codebook (e.g., PUCCH 1), the reception of the triggering DCI, and/or the preparation of the retransmission of the HARQ-ACK codebook (e.g., PUCCH 2). FIG. 2A illustrates an example timeline of operations performed by the user device in accordance with one or more embodiments of the present technology. To ensure that the user device has sufficient time to process and prepare the retransmission, the starting time-unit of the PUCCH retransmission t2 should be at least N time units after the end time-unit t1 of the triggering DCI. The time unit can be a symbol or a slot, and N is a positive integer. N can be determined based on the subcarrier spacing of the PDCCH carrying the triggering DCI and/or the subcarrier spacing of the PUCCH carrying the HARQ-ACK retransmission. For example, N=5 for 11=0, N=5.5 for μ=1, and N=11 for μ=2. Alternatively, or in addition, N=10 for 11=0, N=12 for 11=1, N=22 for 11=2, and N=25 for 11=3, where μ is the numerology value indicating the subcarrier spacing, such as shown in Table 2.

TABLE 2

| μ | Δf = $2^μ$ 15 [kHz] | Cyclic Prefix |
|---|---|---|
| 0 | 15 | Normal |
| 1 | 30 | Normal |
| 2 | 60 | Normal, Extended |
| 3 | 120 | Normal |

Figure 2B:
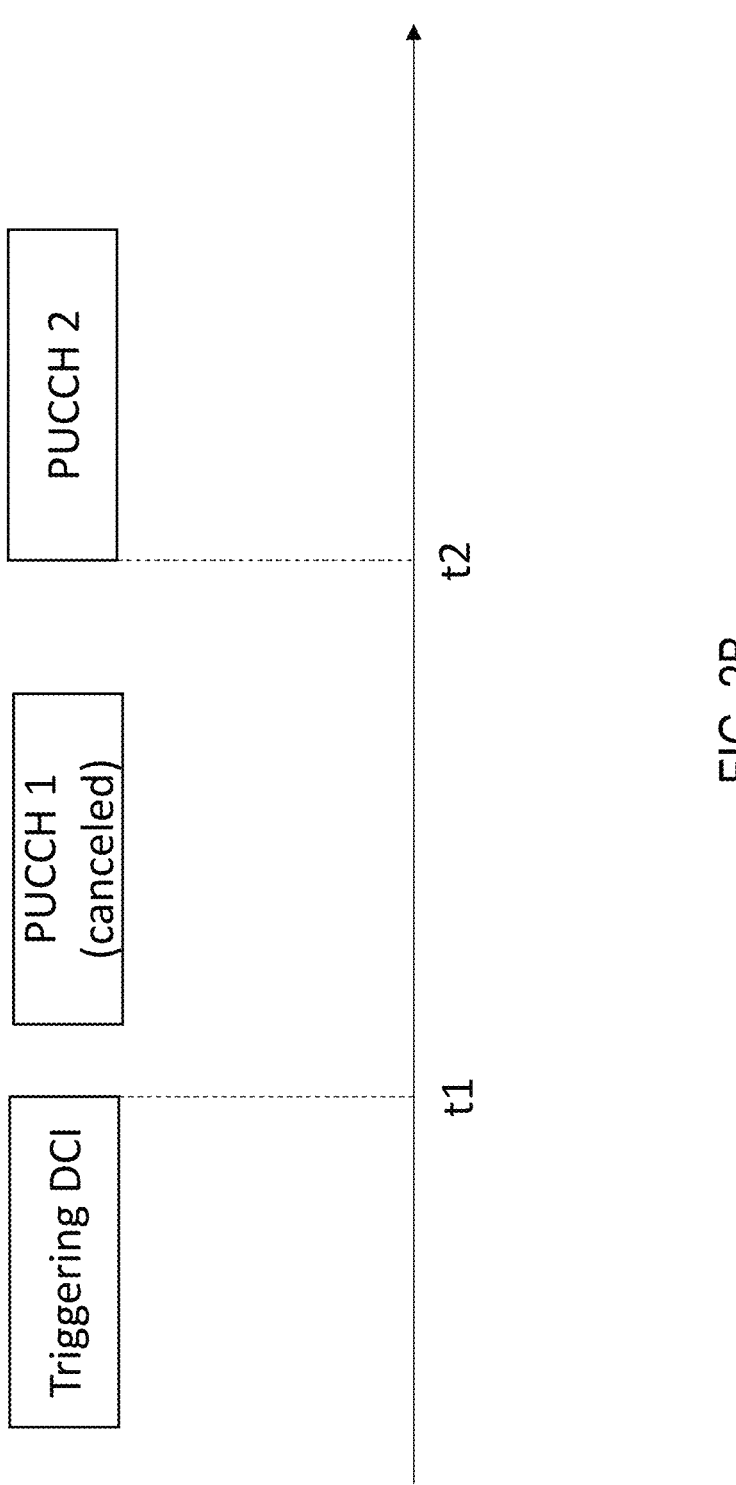
FIG. 2B illustrates another example timeline of operations performed by the user device in accordance with one or more embodiments of the present technology.

FIG. 2B illustrates another example timeline of operations performed by the user device in accordance with one or more embodiments of the present technology. In this example, the triggering DCI is received prior to the PUCCH 1 transmission. The user device determines based on the triggering DCI that PUCCH 1 needs to be canceled and proceeds to cancel the PUCCH 1. Therefore, additional time is needed to cancel PUCCH 1 and prepare PUCCH 2 retransmission. In such cases, the starting time-unit of the PUCCH retransmission t2 should be at least N+d time units after the end time-unit t1 of the triggering DCI. The time unit can be a symbol or a slot, and N and d are integers. N can be determined based on the subcarrier spacing of the channels. The value d can be 0, 1, 2, . . . etc. based on the capability of the user device (that is, certain devices may need additional delay to process the triggering DCI and prepare the PUCCH retransmission).

Embodiment 2

As discussed above, one example method uses a physical layer signaling message to trigger a reconstruction of the HARQ-ACK codebook. For example, for enhanced Type 3 HARQ-ACK codebook, only a set of HARQ processes is used to reconstruct the codebook. A number of set of processes can be configured by the higher-layer signaling (e.g., RRC signaling). For example, the RRC signaling can configure 1, 2, 4 or 8 HARQ process sets. For example, Configuring the UE with 2 HARQ process sets, for example, set 0={HARQ process #0, HARQ process #1, HARQ process #2, HARQ process #3}, set 1={HARQ process #0, HARQ process #1, HARQ process #2, HARQ process #3, HARQ process #4, HARQ process #5, HARQ process #6, HARQ process #7, HARQ process #8}. The user device is indicated that a set 0 including 4 HARQ processes or a set 1 including 8 HARQ processes can be used for the construction or reconstruction of the codebook. The triggering DCI can indicate which set of HARQ processes is used to reconstruct the codebook.

In some embodiments, one special set of HARQ processes can be configured in the RRC signaling, e.g., using a non-numeric value. For example, the base station configures the UE with 2 HARQ process sets, for example, set 0={HARQ process #0, HARQ process #1, HARQ process #2, HARQ process #3}, set 1={S}, here the set 1 is a special set of HARQ processes. When the triggering DCI indicates the special set (e.g., set 1), the user device understands that no reconstruction of the codebook is needed, allowing flexible switching between the retransmission method(s) that require reconstruction and the retransmission method(s) that do no require reconstruction (e.g., as described in Embodiment 1).

In some embodiments, the one or more attributes of the HARQ-ACK codebook indicated by the physical layer signaling message (e.g., DCI signaling) include a HARQ process set. For example, the DAI field can be reused/reinterpreted as the HARQ process set field when reconstructing the codebook is needed (e.g., for enhanced Type 3 codebook).

Some example indication modes are described below.

Mode 1

In some embodiments, the combination of C-DAI and T-DAI in the triggering DCI can be used to represent the HARQ process set field. For example, four bits of C-DAI and T-DAI represent the HARQ process set field. When only one serving cell is configured (see Table 1), the C-DAI field (e.g., 2 bits) can be used to represent the HARQ process set field.

Mode 2

In some embodiments, the T-DAI field (e.g., 2 bits) represents the HARQ process set field.

Mode 3

In some embodiments, the C-DAI field (e.g., 2 bits) represents the HARQ process set field.

Different indication modes can be configured by higher-layer signaling (e.g., Radio Resource Control, RRC, signaling) from the base station.

Embodiment 3

The user device can be configured by the network with a plurality of enhanced Type codebooks. Each enhanced Type 3 codebook is identified by a codebook index. The network can further configure that an enhanced Type3 codebook includes the HARQ-ACK information bits for a plurality of specific HARQ process and serving cells. That is, the one or more attributes associated with the enhanced Type3 codebook include the HARQ process(es) and/or the cell carrying the triggering DCI and/or the scheduled transmission.

In some embodiments, the construction/reconstruction of an enhanced type3 codebook can be triggered by a DCI signaling that optionally schedules a PDSCH transmission at the same time. The serving cell on which the triggering DCI is transmitted is referred to as scheduling cell. The serving cell on which the scheduled PDSCH is transmitted on is referred to as scheduled cell. In some embodiments, the scheduling cell and the scheduled cell can be the same, indicating that the triggering DCI and the scheduled PDSCH are transmitted on the same cell. The triggered enhanced Type3 codebook can be indicated by the HARQ Process Number (HPN) field in the triggering DCI.

In some embodiments, the HPN field indicates the enhanced Type 3 codebook index. A first plurality of the HARQ processes is associated with the enhanced Type 3 codebook or the enhanced Type 3 codebook index. In some embodiments, a HARQ process can only be associated with one enhanced Type 3 codebook or one enhanced Type 3 codebook index. The association relationship can be configured by the network or specified by the protocol. When the HPN field in the triggering DCI indicates a HARQ process, the enhanced Type 3 codebook corresponding to the HARQ process needs to be constructed/reconstructed.

For example, a user device is configured by the network with two serving cells, denoted as cell 0 and cell 1, respectively. There are 8 HARQ processes in each serving cell denoted by HPN 0, 1, 2, 3, 4, 5, 6, 7, respectively. Two enhanced Type 3 codebooks are configured for the user device. The first enhanced Type 3 codebook includes the HARQ-ACK information bits for the HPN 0, 1, 2, 3 of cell 0 and HPN 0, 1 of cell 1. The second enhanced Type 3 codebook includes the HARQ-ACK information bits for the HPN 4, 5, 6, 7 of cell 0 and
HPN 3, 4, 5 of cell 1.

The network further configures that HPN 0, 1, 2, 3 are associated with the first enhanced Type 3 codebook and HPN 4, 5, 6, 7 are associated with the second enhanced Type3 codebook. Thus, the HPN 0, 1, 2, or 3 indicates the first enhanced Type 3 codebook. When the HPN field indicates any of HPN 0, 1, 2, 3, the construction/reconstruction of the first enhanced type3 codebook is triggered by the triggering DCI, and the user device generates and transmits the first enhanced Type 3 codebook. The HPN 4, 5, 6, or 7 indicates the second enhanced Type 3 codebook. When the HPN field indicating any of HPN 4, 5, 6, 7, the construction/reconstruction of the second enhanced type3 codebook is triggered by the triggering DCI, and the user device generates and transmits the second enhanced Type 3 codebook.

In some embodiments, the HPN can uniquely identify the corresponding enhanced Type 3 codebook due to the HAQR-ACK information bits handled by the HARQ process. In those scenarios, when the triggering DCI includes an HPN, the enhanced Type 3 codebook including the HARQ-ACK information bits of the HPN is triggered to be constructed/reconstructed.

For example, two enhanced Type 3 codebooks are configured for the user device. The first enhanced Type 3 codebook includes the HARQ-ACK information bits for the HPN 0, 1, 2, 3 of cell 0 and HPN 0, 1 of cell 1. The second enhanced Type 3 codebook includes the HARQ-ACK information bits for the HPN 4, 5, 6, 7 of cell 0 and HPN 3, 4, 5 of cell 1. The first enhanced Type 3 codebook can be triggered by the triggering DCI with the HPN field indicating any of HPN 0, 1, 2. The second enhanced Type3 codebook can be triggered by the triggering DCI with the HPN field indicating any of 4, 5, 6, 7. It should be noted that the triggering DCI with HPN 3 cannot be used to indicate the enhanced Type3 codebook since both codebooks include the HARQ-ACK information bits of HPN 3 and thus no codebook can be identified uniquely using HPN 3.

In some embodiments, the triggered enhanced type3 codebook is indicated by the scheduling cell or scheduled cell of the triggering DCI. For example, when the scheduling cell or scheduled cell is the cell with the smallest or the largest index in the cell group or PUCCH group, the first enhanced type3 codebook is triggered. The scheduled cell or scheduled cell is the cell with the second smallest or the largest index in the cell group or PUCCH group, the second enhanced type3 codebook is triggered.

In some embodiments, one or more scheduling cells or scheduled cells are associated with an enhanced type3 codebook or an enhanced type3 codebook index. The association can be configured by the network or specified by the protocol. For example, there can be a one-to-one association between the scheduling cell/scheduled cell and the enhanced Type 3 codebook/codebook index. An enhanced type3 codebook is triggered to be constructed/reconstructed by a triggering DCI if the triggering DCI indicates any of the scheduling cells or scheduled cells associated with this enhanced type3 codebook. If a UE receives a triggering DCI with a first scheduling cell or scheduled cell, the enhanced type3 codebook associated with the first scheduling cell or scheduled cell is triggered.

Still referring to the above example of the enhanced Type 3 codebook configuration, the network configures that the cell 0 is associated with the first enhanced Type3 codebook and the cell 1 is associated with the second enhanced Type3 codebook. So scheduling cell 0 or scheduled cell 0 indicates the first enhanced type3 codebook. The first enhanced type3 codebook is triggered if the triggering DCI is transmitted on cell 0 or the scheduled cell 0 is indicated by the triggering DCI. Scheduling cell 1 or scheduled cell 1 indicates the second enhanced type3 codebook. The second enhanced type3 codebook is triggered if the triggering DCI is transmitted on cell 1 or the scheduled cell 1 is indicated by the triggering DCI.

In some embodiments, if the triggering DCI indicates the scheduled cell is the first cell or the triggering DCI is transmitted on the first cell (that is, scheduling cell is the first cell), an enhanced Type3 codebook including the HARQ-ACK information bits for the first cell is triggered. In this case, the triggered enhanced Type 3 codebook is determined based on the unique association with the first cell—the HARQ-ACK information bits for the first cell can only be included in the triggered enhanced Type3 codebook.

In some embodiments, the triggered enhanced Type3 codebook is indicated by the HPN field and the scheduling cell together. In some embodiments, the triggered enhanced Type3 codebook index can be indicated by the HPN field and carrier indicator field together. For example, the HPN field has 1 bit and carrier field has 1 bit. They are concatenated to obtain a 2-bit information for indicating the codebook index. The value "00" indicates the first enhanced type3 codebook (e.g., enhanced type3 codebook index 0). The value '01' indicates the second enhanced type3 codebook index (e.g., enhanced type3 codebook index 1), and so on.

In some embodiments, a plurality of the combinations of the HPN and the scheduling/scheduled cell are associated with an enhanced Type3 codebook or an enhanced Type3 codebook index. The association can be configured by the network or specified by the protocol. In some embodiments, the combination of a HPN and a scheduling/scheduled cell has a one-to-one association with an enhanced type3 codebook or codebook index. An enhanced type3 codebook is triggered by a triggering DCI if the HPN and the scheduling/scheduled cell indicated by the triggering DCI is the combination associated with this enhanced type3 codebook. For example, the combination {HPN0, cell0} is associated with the first enhanced Type 3 codebook and {HPN 2, cell 1} is associated with the second enhanced Type3 codebook. If the HPN indicated by the triggering DCI is 0 and the scheduled cell indicated by the triggering DCI is 0, the first enhanced type3 codebook is triggered. If the HPN indicated by the triggering DCI is 2 and the scheduled cell indicated by the triggered DCI is cell 1, the second enhanced type3 codebook is triggered. In some embodiments, the combination of a HPN and a scheduling/scheduled cell has a multi-to-one association with an enhanced type3 codebook or codebook index. An enhanced type3 codebook is triggered by a triggering DCI if the HPN and the scheduling/scheduled cell indicated by the triggering DCI is one of the combinations associated with this enhanced type3 codebook.

In some embodiments, an enhanced Type 3 codebook triggered to be constructed/reconstructed can be determined by the first cell and the first HPN uniquely. The HARQ-ACK information bits for the first HPN in the first cell can only be included in the triggered enhanced type3 codebook. Referring back to the example of the enhanced type3 codebook configuration above, if the triggering DCI indicates (1) the HPN is any of the HPN 0, 1, 2, 3 and the scheduled cell is cell 0, or (2) the HPN is any of HPN 0, 1 and the scheduled cell is cell 1, the first enhanced type3 codebook is triggered. If the triggering DCI indicates (1) the HPN is any of the HPN 4, 5, 6, 7 and the scheduled cell is cell 0, or (2) the HPN is any of 3, 4, 5 and the scheduled cell is cell 1, the second enhanced type3 codebook is triggered.

Embodiment 4

In some embodiments, the HARQ-ACK transmission is delayed instead of being canceled/dropped when there is a collision of network resources. For example, when the Semi-Persistent Scheduling (SPS) HARQ-ACK corresponding to the SPS transmission conflicts with a downlink symbol, the HARQ-ACK transmission is delayed from an "initial" slot in time domain to a target slot. For SPS HARQ-ACK deferral, the operation in the "initial" slot is further clarified as when the UE performs first the Uplink Control Information (UCI) multiplexing operation. If after the UCI multiplexing operation into a PUCCH or PUSCH if any, and if the UE would be transmitting SPS HARQ-ACK using the PUCCH SPS-PUCCH-AN-List-r16 or n1PUCCH-AN which is not valid, the SPS HARQ-ACK configured for deferral is deferred.

When the channels have the same priority, for SPS HARQ-ACK deferral, the target PUCCH slot is defined as the next PUCCH slot, where after performing the UCI multiplexing operation into a PUCCH or PUSCH if any, the UE either (i) transmits HARQ-ACK using a PUCCH/PUSCH other than the PUCCH determined from PUCCH SPS-PUCCH-AN-List-r16 or n1PUCCH-AN or (ii) transmits HARQ-ACK using a PUCCH resource configured in PUCCH SPS-PUCCH-AN-List-r16 or n1PUCCH-AN being regarded as valid. The target PUCCH slot determination is based on the total HARQ-ACK payload size including deferred SPS HARQ-ACK information and non-deferred HARQ-ACK information (if any) of a candidate target PUCCH slot. The final PUCCH resource selection in the target PUCCH slot in terms of PUCCH resource set and PUCCH resource ID follows the Rel-16 of the 3GPP standard.

Rel-17 of the 3GPP standards introduces multiplexing between high- and low-priority channels. For example, if high-priority channels and low-priority channels overlap in time domain, UCIs from overlapping channels can be multiplexed into one PUCCH/PUSCH for transmission (instead of discarding the low-priority channel as in Rel-16). When the multiplexing of channels with different priorities is considered, the SPS delay feedback has a new impact. This patent document further discloses techniques that can be implemented in various embodiments to determine the target slot position for channel multiplexing with different priorities.

Example 1

Some example scenarios based on configuration of SPS HARQ-ACK delayed feedback and/or the Rel-17 retransmission of cancelled HARQ-ACK are described below.

Scenario 1: SPS transmission is configured with delayed feedback. If there is a low priority (LP) or high priority (HP) SPS HARQ-ACK PUCCH that needs to be transmitted in a slot, and the UE is instructed to allow multiplexing of the LP channel and HP channel, the UE performs multiplexing, After the multiplexing, if the PUCCH of the multiplexing result is invalid (for example, conflicts with downlink symbols), the HARQ-ACKs corresponding to the LP (or HP) SPS HARQ-ACK PUCCH are delayed for feedback. Note that in this multiplexing case, the PUCCH of the multiplexing is a high-priority channel.

Scenario 2: SPS transmission is configured with delayed feedback. If there is an LP SPS HARQ-ACK PUCCH that needs to be transmitted in a slot, and the UE is instructed to not allow multiplexing of the LP channel and the HP channel, then for the LP SPS HARQ-ACK PUCCH, the multiplexing of channels with the same priority is performed. After the UE performs channel multiplexing with the same priority, if the PUCCH of the multiplexing result is invalid (for example, conflicts with downlink symbols), the HARQ-ACKs corresponding to the LP SPS HARQ-ACK PUCCH are delayed for feedback. That is, the corresponding SPS HARQ-ACK needs to perform target slot determination and be transmitted in the determined target slot.

Scenario 3: SPS transmission is configured with delayed feedback. If there is an (LP) SPS HARQ-ACK PUCCH that needs to be transmitted in a slot, and the UE is instructed to not allow multiplexing of the LP channel and the HP channel, then for the (LP) SPS HARQ-ACK PUCCH, the multiplexing of channels with the same priority is performed. After the UE performs channel multiplexing with the same priority, if the PUCCH or PUSCH of the multiplexing result is cancelled (for example, it is valid but conflicts with the HP channel and not conflicts with the downlink symbol), the HARQ-ACKs corresponding to the (LP) SPS HARQ-ACK PUCCH are processed according to one of the following:

(1) The SPS HARQ-ACK delay condition is met, and the SPS HARQ-ACK should perform delay feedback. That is, the corresponding SPS HARQ-ACK needs to perform target slot determination and be transmitted in the determined target slot.

(2) The condition of SPS HARQ-ACK delay is not satisfied, and SPS HARQ-ACK should not perform delay feedback. That is, the corresponding SPS HARQ-ACK will be cancelled for transmission, and there is no need to perform target slot determination. If necessary, other transmission methods are considered for the delayed SPS HARQ-ACK. For example, a DCI triggers a retransmission for the cancelled HARQ-ACK codebook. That is, even when the SPS HARQ-ACK PUCCH delayed feedback mechanism is configured, if the PUCCH of the multiplexed result is cancelled due to a conflict with the high-priority channel, the SPS HARQ-ACK delayed feedback is stopped for the SPS HARQ-ACK, but the HARQ-ACK codebook retransmission mechanism is executed for the cancelled the SPS HARQ-ACK (e.g., the method in Embodiment 1).

Scenario 4: SPS transmission is configured with delayed feedback. If there is an HP SPS HARQ-ACK PUCCH that needs to be transmitted in a slot, and the UE is instructed to not allow multiplexing of the LP channel and the HP channel, then for the HP SPS HARQ-ACK PUCCH, the multiplexing of channels with the same priority is performed. After the UE performs channel multiplexing with the same priority, if the PUCCH of the multiplexing result is invalid (for example, conflicts with downlink symbols), the HARQ-ACKs corresponding to the HP SPS HARQ-ACK PUCCH are delayed for feedback. That is, the corresponding SPS HARQ-ACK needs to perform target slot determination and be transmitted in the determined target slot.

The determination of the target slot corresponding to the example scenarios above is described below.

Case 1: After SPS HARQ-ACK is determined to perform delayed feedback, if the UE is instructed to allow high- and low-priority channel multiplexing in a slot, and if the LP (or HP) SPS HARQ-ACK is multiplexed between high and low priority channels in the slot, and the PUCCH/PUSCH of the multiplexing result is valid (for example, not conflicts with downlink symbols), then this slot is the target slot. The delayed SPS HARQ-ACK is transmitted on the PUCCH/PUSCH of the multiplexing result.

Case 2: After SPS HARQ-ACK is determined to perform delayed feedback, if the UE is instructed to not allow high- and low-priority channel multiplexing in a slot, if for the LP SPS HARQ-ACK PUCCH, the multiplexing of channels with the same priority is performed in the slot, and the PUCCH/PUSCH of the multiplexing result is valid and has not been cancelled (for example, not conflicts with downlink symbols and HP channel), then this slot is the target slot. The delayed SPS HARQ-ACK is transmitted on the PUCCH/PUSCH of the multiplexing result.

Case 3: After SPS HARQ-ACK is determined to perform delayed feedback, if the UE is instructed to not allow high- and low-priority channel multiplexing in a slot, if for the (LP) SPS HARQ-ACK PUCCH, the multiplexing of channels with the same priority is performed in the slot, and the PUCCH/PUSCH of the multiplexing result is valid but has been cancelled (for example, not conflicts with downlink symbols but conflicts with HP channel), then the UE processes according to one of the following:

(1) The UE determines that this slot is the target slot. The delayed SPS HARQ-ACK cannot be transmitted because the PUCCH/PUSCH of the multiplexing result is cancelled, but the delayed SPS HARQ-ACK can no longer be delayed for transmission.

(2) The UE determines that this slot is the target slot. The delayed SPS HARQ-ACK cannot be transmitted because the PUCCH/PUSCH of the multiplexing result is cancelled, and the delayed SPS HARQ-ACK can continue to be delayed for transmission. If necessary, other transmission methods are considered for the delayed SPS HARQ-ACK. For example, a DCI triggers a retransmission for the cancelled HARQ-ACK codebook. That is, even when the SPS HARQ-ACK PUCCH delayed feedback mechanism is configured, if the PUCCH of the multiplexed result is cancelled due to a conflict with the high-priority channel, the SPS HARQ-ACK delayed feedback is stopped for the SPS HARQ-ACK, but the HARQ-ACK codebook retransmission mechanism is executed based on triggering DCI for the cancelled the SPS HARQ-ACK(e.g., the method in Embodiment 1).

(3) The UE determines that this slot is not the target slot. The delayed SPS HARQ-ACK cannot be transmitted because the PUCCH/PUSCH of the multiplexing result is cancelled, but the delayed SPS HARQ-ACK can continue to be delayed for transmission.

(4) The UE determines that this slot is not the target slot. The delayed SPS HARQ-ACK cannot be transmitted because the PUCCH/PUSCH of the multiplexing result is cancelled, but the delayed SPS HARQ-ACK can no longer be delayed for transmission. If necessary, other transmission methods are considered for the delayed SPS HARQ-ACK. For example, a DCI triggers a retransmission for the cancelled HARQ-ACK codebook.

Case 4: After SPS HARQ-ACK is determined to perform delayed feedback, if the UE is instructed to not allow high- and low-priority channel multiplexing in a slot, and if for the HP SPS HARQ-ACK PUCCH, the multiplexing of channels with the same priority is performed in the slot, and the PUCCH/PUSCH of the multiplexing result is valid (for example, not conflicts with downlink symbols), then this slot is the target slot. The delayed SPS HARQ-ACK is transmitted on the PUCCH/PUSCH of the multiplexing result.

Example 2

When the UE is configured to schedule a cancelled HARQ-ACK codebook mechanism, the UE can also be configured with the SPS HARQ-ACK delay feedback mechanism. For the processing in the initial slot, if an SPS HARQ-ACk is multiplexed with other PUCCH, and if the other PUCCH corresponds to a cancelled HARQ-ACK codebook (denoted as codebook k) scheduled for transmission in the slot, the UE multiplexes the SPS HARQ-ACK with codebook k into one PUCCH. If the PUCCH of the multiplexing result is invalid, the SPS HARQ-ACK will be delayed for feedback. The PUCCH of the multiplexing result is determined based on the DCI of the scheduling codebook k, e.g., based on the PRI in the DCI.

In some embodiments, a delayed SPS HARQ-ACK is multiplexed with other PUCCH in order to determine the target slot. If the other PUCCH corresponds to a cancelled HARQ-ACK codebook scheduled for transmission in the slot, the UE multiplexes SPS HARQ-ACK with codebook k into one PUCCH. If the PUCCH of the multiplexing result is valid, the slot is the target slot. The PUCCH of the multiplexing result is determined based on the DCI of the scheduling codebook k, e.g., based on the PRI in the DCI.

In some embodiments, the multiplexing rule is that the delayed SPS HARQ-ACK is concatenated with the HARQ-ACK codebook scheduled for transmission. For example, the delayed SPS HARQ-ACK concatenation is after the cancelled HARQ-ACK codebook scheduled for transmission.

In some embodiments, details described Example 2 can be combined with the details described in Example 1. For example, when SPS HARQ-ACK and codebook k have different priorities, the processing of the Example 1 can be reused. The PUCCH of the multiplexing result in the Example 1 is replaced with the PUCCH of the multiplexing result in the Example 2.

Some embodiments may preferably implement the following solutions.

A set of preferred solutions may include the following (e.g., as described with reference to Embodiments 1-3).

Figure 3A:
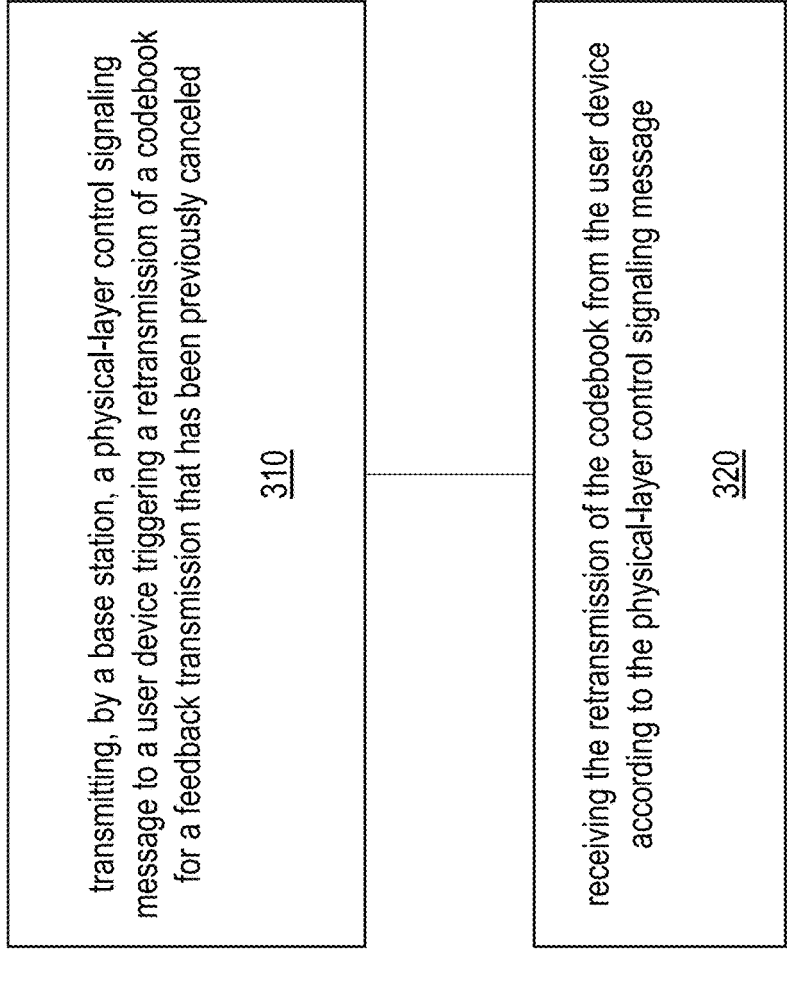
FIG. 3A is a flowchart representation of a method for wireless communications in accordance with one or more embodiments of the present technology.

1. A method for wireless communication (e.g., method 300 depicted in FIG. 3A), comprising: transmitting (310), by a base station, a physical-layer control signaling message to a user device triggering a retransmission of a codebook for a feedback transmission that has been previously canceled. The physical-layer control signaling message includes a field of resource assignment that is used to indicate an attribute associated with the codebook. The method 300 also comprises receiving (320), by the base station, the retransmission of the codebook from the user device according to the physical-layer control signaling message.

2. The method of solution 1, wherein the attribute associated with the codebook includes a size of the codebook.

3. The method of solution 1 or 2, wherein the attribute associated with the codebook includes an offset associated with a position of the canceled feedback transmission.

4. The method of solution 3, wherein the field of resource assignment comprises multiple sub-fields, and the method further includes transmitting, by the base station, a higher-layer control signaling message to the user device indicating how the size and the offset are indicated using the multiple sub-fields.

5. The method of solution 3 or 4, comprising configurating, by the base station, a set of offset values indicating the position of the canceled feedback transmission, wherein the physical-layer control signaling message includes an index indicating the offset value in the set.

6. The method of any of solution 1 to 5, wherein the attribute associated with the codebook includes a set of HARQ processes used to construct the codebook.

7. The method of any of solution 1 to 6, wherein the physical-layer control signaling message further schedules a downlink data transmission, and the method comprises performing the downlink data transmission to the user device according to the physical-layer control signaling message.

8. The method of any of solution 1 to 7, wherein the field of resource assignment is a downlink assignment index (DAI) field.

9. The method of solution 8, wherein the multiple sub-fields include a first sub-field indicating a counter for the resource assignment and a second sub-field indicating a total value for the resource assignment.

10. The method of any of solution 1 to 9, wherein the retransmission of the codebook is performed at N time units after a last time unit of the physical-layer control signaling message, wherein a time unit is a symbol or a slot, and wherein N is a positive integer.

11. The method of any of solution 1 to 10, further comprising transmitting, by the base station, a second signaling message prior to the retransmission, the second signaling message configuring a set of processes for retransmitting one or more canceled feedback transmissions, wherein the second signaling includes a specific value indicating that the codebook is to be retransmitted without being reconstructed.

Figure 3B:
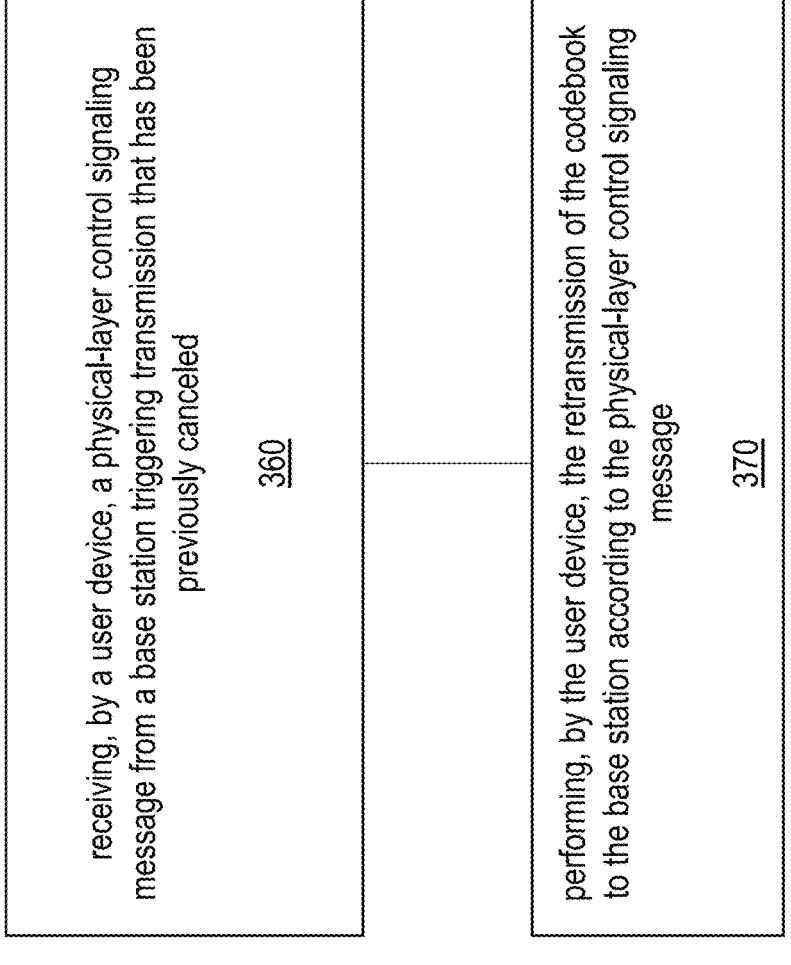
FIG. 3B is a flowchart representation of a method for wireless communications in accordance with one or more embodiments of the present technology.

12. A method for wireless communication (e.g., method 350 depicted in FIG. 3B), comprising: receiving (360), by a user device, a physical-layer control signaling message from a base station triggering a retransmission of a codebook for a feedback transmission that has been previously canceled. The physical-layer control signaling message includes a field of resource assignment that is used to indicate an attribute associated with the codebook. The method also includes performing (370), by the user device, the retransmission of the codebook to the base station according to the physical-layer control signaling message.

13. The method of solution 12, wherein the attribute associated with the codebook includes a size of the codebook.

14. The method of solution 12 or 13, wherein the attribute associated with the codebook includes an offset associated with a position of the canceled feedback transmission.

15. The method of solution 14, wherein the field of resource assignment comprises multiple sub-fields, and the method further comprising receiving, by the user device, a higher-layer control signaling message from the base station indicating how the size and the offset are indicated using the multiple sub-fields.

16. The method of solution 14 or 15, comprising receiving, by the user device, a set of offset values indicating the position of the canceled feedback transmission, wherein the physical-layer control signaling message includes an index indicating the offset value in the set.

17. The method of any of solution 12 to 16, wherein the attribute associated with the codebook includes a set of HARQ processes used to construct the codebook.

18. The method of any of solution 12 to 17, wherein the physical-layer control signaling message further schedules a downlink data transmission, and the method comprising receiving the downlink data transmission from the base station according to the physical-layer control signaling message.

19. The method of any of solution 12 to 18, wherein the field of resource assignment is a downlink assignment index (DAI) field.

20. The method of solution 19, wherein the multiple sub-fields include a first sub-field indicating a counter for the resource assignment and a second sub-field indicating a total value for the resource assignment.

21. The method of any of solution 12 to 20, wherein the retransmission of the codebook is performed at N time units after a last time unit of the physical-layer control signaling message, wherein a time unit is a symbol or a slot, and wherein N is a positive integer.

22. The method of any of solution 12 to 21, further comprising receiving, by the user device, a second signaling message prior to the retransmission, the second signaling message configuring a set of processes for retransmitting one or more canceled feedback transmissions, wherein the second signaling includes a specific value indicating that the codebook is to be retransmitted without being reconstructed.

Figure 4:
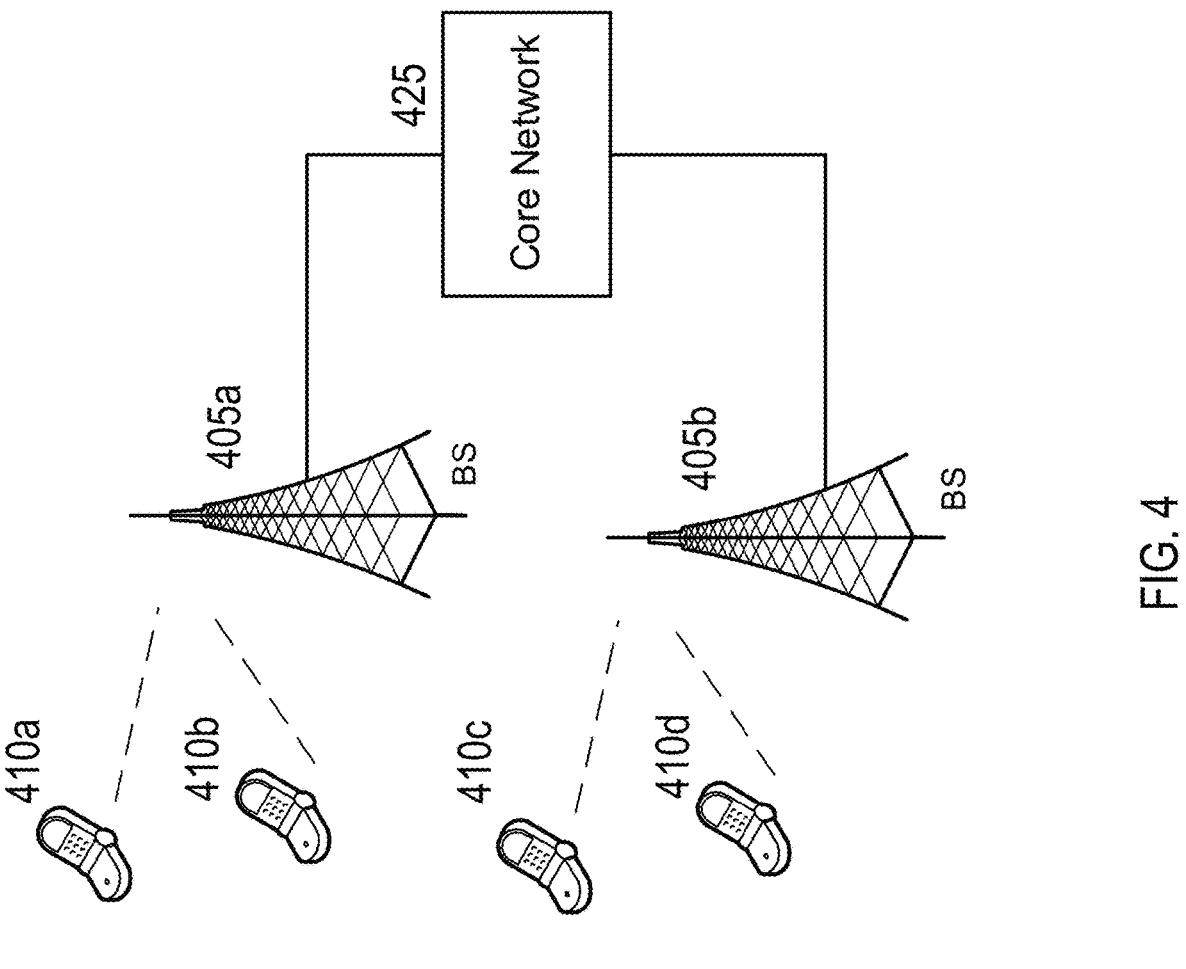
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more user devices 410a, 410b, 410c, 410d, and a core network 425. A base station 405a, 405b can provide wireless service to user devices 410a, 410b, 410c and 410d in one or more wireless sectors. In some implementations, a base station 405a, 405b includes directional antennas to produce two or more directional beams to provide wireless coverage in different sectors. The core network 425 can communicate with one or more base stations 405a, 405b. The core network 425 provides connectivity with other wireless communication systems and wired communication systems. The core network may include one or more service subscription databases to store information related to the subscribed user devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The user devices 410a, 410b, 410c, and 410d can support multiple different radio access technologies. The techniques and embodiments described in the present document may be implemented by the base stations of wireless devices described in the present document.

Figure 5:
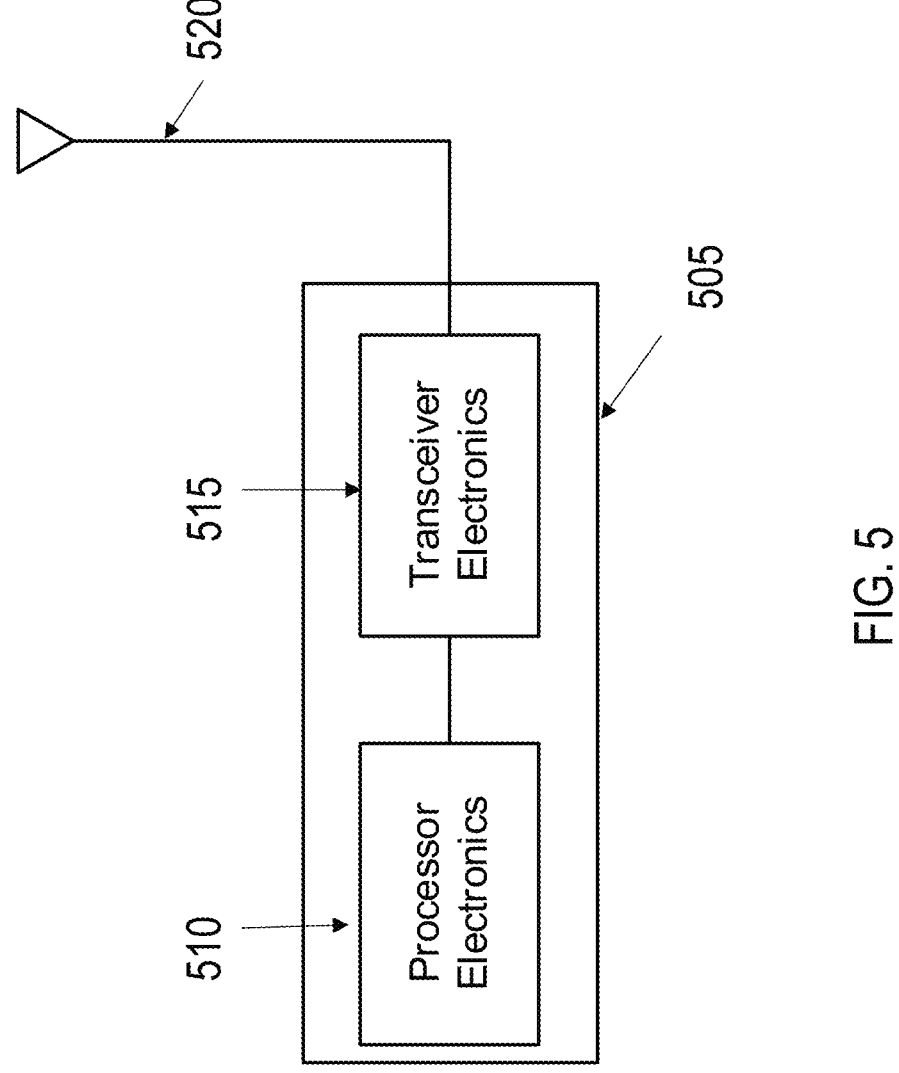
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a network node, a base station, or a wireless device (or a user device, UE) can include processor electronics 510 such as a microprocessor that implements one or more of the wireless techniques presented in this document. The radio station 505 can include transceiver electronics to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505. In some embodiments, the radio station 505 may be configured to perform the methods described herein.

It will be appreciated that the present document discloses techniques that can be embodied in various embodiments to facilitate the indication of the HARQ-ACK codebook for retransmission without increasing the signaling overhead or blind detection complexity. The disclosed techniques can also be applied to determine the target time for delayed HARQ-ACK transmissions. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a user equipment (UE), a configuration used for a delayed feedback for a Semi-Persistent Scheduling (SPS) transmission from a base station,
and, and wherein the delayed feedback for the SPS transmission refers to: a transmission for Hybrid Automatic Repeat Request Acknowledgement (HARQ-ACK) information corresponding to the SPS transmission overlaps with a downlink symbol in an initial slot, then the transmission for the HARQ-ACK information is delayed from the initial slot to a target slot; and
selectively initiating, by the UE, a determination of the target slot for transmitting the HARQ-ACK information,
wherein a slot comprising a Physical Uplink Control Channel (PUCCH) multiplexing the HARQ-ACK information of the SPS transmission is the target slot; and
wherein the delayed feedback for the SPS transmission is stopped in response to the PUCCH multiplexing the HARQ-ACK information being dropped due to an overlapping with a transmission having a high priority.

2. The method of claim 1, wherein the PUCCH multiplexing the HARQ-ACK information is transmitted in the target slot in response to the PUCCH multiplexing the HARQ-ACK information not overlapping with a downlink symbol and not being dropped due to a transmission having a high priority.

3. The method of claim 1, wherein determination of the target slot for the delayed feedback is not performed upon a PUCCH resource for carrying the HARQ-ACK information of the SPS transmission being dropped due to an overlapping with a transmission having a high priority.

4. The method of claim 1, wherein the HARQ-ACK information of the SPS transmission is concatenated with a HARQ-ACK codebook scheduled for another transmission.

5. The method of claim 1, comprising:
transmitting, by the UE, the HARQ-ACK information of the SPS transmission using the target slot.

6. A method for wireless communication, comprising:
transmitting, by a base station, a configuration used for a delayed feedback for a Semi-Persistent Scheduling (SPS) transmission to a user equipment (UE), and wherein the delayed feedback for the SPS transmission refers to: a transmission for Hybrid Automatic Repeat Request Acknowledgement (HARQ-ACK) information corresponding to the SPS transmission overlaps with a downlink symbol in an initial slot, then the transmission for the HARQ-ACK information is delayed from the initial slot to a target slot; and
selectively receiving, by the base station, the HARQ-ACK information of the SPS transmission using the target slot,
wherein a slot comprising a Physical Uplink Control Channel (PUCCH) multiplexing the HARQ-ACK information of the SPS transmission is the target slot; and
wherein the delayed feedback for the SPS transmission is stopped in response to the PUCCH multiplexing the HARQ-ACK information being dropped due to an overlapping with a transmission having a high priority.

7. The method of claim 6, wherein the PUCCH multiplexing the HARQ-ACK information is transmitted in the target slot in response to the PUCCH multiplexing the HARQ-ACK information not overlapping with a downlink symbol and not being dropped due to a transmission having a high priority.

8. The method of claim 6, wherein determination of the target slot for the delayed feedback is not performed upon a PUCCH resource for carrying the HARQ-ACK information of the SPS transmission being dropped due to an overlapping with a transmission having a high priority.

9. The method of claim 6, wherein the HARQ-ACK information of the SPS transmission is concatenated with a HARQ-ACK codebook scheduled for another transmission.

10. A device for wireless communication, comprising at least one processor configured to:

receive a configuration used for a delayed feedback for a Semi-Persistent Scheduling (SPS) transmission from a base station, and wherein the delayed feedback for the SPS transmission refers to: a transmission for Hybrid Automatic Repeat Request Acknowledgement (HARQ-ACK) information corresponding to the SPS transmission overlaps with a downlink symbol in an initial slot, then the transmission for the HARQ-ACK information is delayed from the initial slot to a target slot; and selectively initiate a determination of the target slot for transmitting the HARQ-ACK information, wherein a slot comprising a Physical Uplink Control Channel (PUCCH) multiplexing the HARQ-ACK information of the SPS transmission is the target slot; and wherein the delayed feedback for the SPS transmission is stopped in response to the PUCCH multiplexing the HARQ-ACK information being dropped due to an overlapping with a transmission having a high priority.

11. The device of claim 10, wherein the PUCCH multiplexing the HARQ-ACK information is transmitted in the target slot in response to the PUCCH multiplexing the HARQ-ACK information not overlapping with a downlink symbol and not being dropped due to a transmission having a high priority.

12. The device of claim 10, wherein determination of the target slot for the delayed feedback is not performed upon a PUCCH resource for carrying the HARQ-ACK information of the SPS transmission being dropped due to an overlapping with a transmission having a high priority.

13. The device of claim 10, wherein the HARQ-ACK information of the SPS transmission is concatenated with a HARQ-ACK codebook scheduled for another transmission.

14. The device of claim 10, wherein the at least one processor is configured to:

transmit the HARQ-ACK information of the SPS transmission using the target slot.

15. A device for wireless communication, comprising at least one processor configured to:

transmit a configuration used for a delayed feedback for a Semi-Persistent Scheduling (SPS) transmission to a user equipment (UE), and wherein the delayed feedback for the SPS transmission refers to: a transmission for Hybrid Automatic Repeat Request Acknowledgement (HARQ-ACK) information corresponding to the SPS transmission overlaps with a downlink symbol in an initial slot, then the transmission for the HARQ-ACK information is delayed from the initial slot to a target slot; and selectively receive the HARQ-ACK information of the SPS transmission using the target slot, wherein a slot comprising a Physical Uplink Control Channel (PUCCH) multiplexing the HARQ-ACK information of the SPS transmission is the target slot; and wherein the delayed feedback for the SPS transmission is stopped in response to the PUCCH multiplexing the HARQ-ACK information being dropped due to an overlapping with a transmission having a high priority.

16. The device of claim 15, wherein the PUCCH multiplexing the HARQ-ACK information is transmitted in the target slot in response to the PUCCH multiplexing the HARQ-ACK information not overlapping with a downlink symbol and not being dropped due to a transmission having a high priority.

17. The device of claim 15, wherein determination of the target slot for the delayed feedback is not performed upon a PUCCH resource for carrying the HARQ-ACK information of the SPS transmission being dropped due to an overlapping with a transmission having a high priority.

18. The device of claim 15, wherein the HARQ-ACK information of the SPS transmission is concatenated with a HARQ-ACK codebook scheduled for another transmission.

* * * * *